US005724446A

United States Patent [19]
Liu et al.

[11] Patent Number: 5,724,446
[45] Date of Patent: Mar. 3, 1998

[54] VIDEO DECODER APPARATUS USING NON-REFERENCE FRAME AS AN ADDITIONAL PREDICTION SOURCE AND METHOD THEREFOR

[75] Inventors: Yi Liu; Michael R. Tucker; Geoffrey S. Strongin, all of Austin, Tex.

[73] Assignee: Advanced Micro Devices, Inc., Sunnyvale, Calif.

[21] Appl. No.: 424,037

[22] Filed: Apr. 18, 1995

[51] Int. Cl.$^6$ .................. G06K 9/36; G06K 9/46
[52] U.S. Cl. .................. 382/233; 382/236; 348/402; 348/416
[58] Field of Search .................. 382/232, 233, 382/236, 238, 107; 348/400, 401, 402, 407, 413, 415, 416, 420

[56] References Cited

U.S. PATENT DOCUMENTS

| | | | |
|---|---|---|---|
| 5,150,210 | 9/1992 | Hoshi et al. | 358/135 |
| 5,227,878 | 7/1993 | Puri et al. | 358/136 |
| 5,247,363 | 9/1993 | Sun et al. | 358/167 |
| 5,347,308 | 9/1994 | Wai | 348/394 |
| 5,353,062 | 10/1994 | Maeda | 348/412 |
| 5,369,438 | 11/1994 | Kim | 348/402 |
| 5,386,232 | 1/1995 | Golin et al. | 348/391 |
| 5,410,553 | 4/1995 | Choon | 371/31 |
| 5,497,434 | 3/1996 | Wilson | 382/232 |
| 5,515,388 | 5/1996 | Yagasaki | 371/49.1 |
| 5,552,831 | 9/1996 | Machida et al. | 348/416 |
| 5,565,921 | 10/1996 | Sasaki et al. | 348/409 |
| 5,576,958 | 11/1996 | Kawakatsu et al. | 364/725 |
| 5,614,958 | 3/1997 | Shikakura | 348/402 |

FOREIGN PATENT DOCUMENTS 0 542 195 A2  11/1992  European Pat. Off. .
0 551 599 A1  11/1992  European Pat. Off. .

OTHER PUBLICATIONS

Dr. Richard Baker, "Standards Dominate Videoconferencing Implementations", Computer Design, Dec. 1994, pp. 66–70.
Stephen Ohr, "Digital Video Spearheads TV and Videoconferencing Applications", Computer Design, Dec. 1994, pp. 59–64.
Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb., 1994, pp. 1–11.
Peng H. Ang, et al., "Video Compression Makes Big Gains", IEEE Spectrum, Oct. 1991, pp. 16–19.
Andy C. Hung, et al, "A Comparison of Fast Inverse Discrete Cosine Transform Algorithms", Multimedia Systems, ©1994, pp. 204–217.
P1180/D1, "Draft Standard Specification for the Implementations of 8×8 Inverse Discrete Cosine Transform", May 29, 1990, pp. 1–9.

(List continued on next page.)

Primary Examiner—Leo Boudreau
Assistant Examiner—Phuoc Tran
Attorney, Agent, or Firm—Skjerven, Morrill, MacPherson, Franklin & Friel, L.L.P.; Andrew C. Graham

[57] ABSTRACT

An video decoder system, such as for use with MPEG video compression, uses a previous B-frame as an additional prediction source for the current B-frame, along with the past and future reference frames as defined by the MPEG specification. In one embodiment a given macroblock within a current B-frame "N" reuses pixel values from the previous B-frame "N–1" if they are "similar enough" to the anticipated pixels which would otherwise need to be computed. For a given macroblock, motion vectors for both B-frames are compared: if they differ by less than a similarity threshold value, then the pixel values from the previous B-frame are reused without further computation. The similarity threshold may be adaptively adjusted to reduce the computational burden of video decompression, while affording a gradual degradation of picture quality, rather than wholesale skipping of entire frames.

38 Claims, 5 Drawing Sheets

OTHER PUBLICATIONS

ISO/IEC 11172-1, "Information Technology–Coding of Moving Pictures and Associated Audio for Digital Storage Media at up to about 1.5 Mbit/s—Part 1: Systems", Aug. 1, 1993, pp. i–vi, 1–53.

ISO/IEC 11172-2, "Information Technology–Coding of Moving Pictures and Associated Audio for Digital Storage Media at up to about 1.5 Mbit/s—Part 2: Video", Aug. 1, 1993, pp. i–ix, 1–112.

ISO/IEC 11172-3, "Information Technology–Coding of Moving Pictures and Associated Audio for Digital Storage Media at up to about 1.5 Mbit/s—Part 3: Audio", Aug. 1, 1993, pp. i–vi, 1–150.

Kevin L. Gong, et al., "Parallel MPEG-1 Video Encoding", Report, University of California, Berkeley, Computer Science Division, 1994, pp. 1–14.

5,724,446

VIDEO DECODER APPARATUS USING NON-REFERENCE FRAME AS AN ADDITIONAL PREDICTION SOURCE AND METHOD THEREFOR

CROSS-REFERENCE TO RELATED APPLICATIONS

This application is related to the commonly-assigned copending patent application entitled "Method of Adaptively Performing Motion Compensation in a Video Processing Apparatus" by Geoffrey S. Strongin, Yi Liu, and Michael R. Tucker, Attorney Docket No. M-3230US, (Ser. No. 08/424,019, filed Apr. 18, 1995), the disclosure of which is incorporated herein by reference.

BACKGROUND OF THE INVENTION

The present invention relates to decompression and, more particularly, to decompression of video information.

Video information requires a large amount of storage space, therefore video information is generally compressed before it is stored. Accordingly, to display compressed video information which is stored, for example, on a compact disk read only memory (CD ROM), the compressed video information is decompressed to furnish decompressed video information. The decompressed video information is then communicated in a bit stream to a display. The bit stream of video information is generally stored in a plurality of memory storage locations corresponding to pixel locations on a display. The stored video information is generally referred to as a bit map. The video information representing a single screen of information on a display is called a frame. A goal of many video systems is to quickly and efficiently decode compressed video information to enable a motion video capability.

Standardization of recording media, devices and various aspects of data handling, such as video compression, is highly desirable for continued growth of this technology and its applications. One compression standard which has attained wide spread use for compressing and decompressing video information is the Moving Pictures Expert Group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 which is hereby incorporated by reference in its entirety.

Frames within the MPEG standard are divided into 16×16 pixel macroblocks. Each macroblock includes six 8×8 blocks: four luminance (Y) blocks, one chrominance red ($C_r$) block and one chrominance blue ($C_b$) block. The luminance blocks correspond to sets of 8×8 pixels on a display and control the brightness of respective pixels. The chrominance blocks to a large extent control the colors for sets of four pixels. For each set of four pixels on the display, there is a single $C_r$ characteristic and a single $C_b$ characteristic.

For example, referring to FIG. 1, labeled prior art, a frame presented by a typical display includes 240 lines of video information in which each line has 352 pixels. Accordingly, a frame includes 240×352=84,480 pixel locations. Under the MPEG standard, this frame of video includes 44 by 30 luminance blocks or 1320 blocks of luminance video information. Additionally, because each macroblock of information also includes two corresponding chrominance blocks, each frame of video information also includes 330 $C_r$ blocks and 330 $C_b$ blocks. Accordingly, each frame of video information requires 126,720 pixels or a total of 1,013,760 bits of bit-mapped storage space for presentation on a display.

There are three types of frames of video information which are defined by the MPEG standard: intra-frames (I frame), forward predicted frames (P frame) and bi-predicted frames (B frame). An example frame sequence is shown in FIG. 2, labelled prior art, which represents one of but many possible frame sequences supported by MPEG.

An I frame, such as I-frame 20, is encoded as a single image having no reference to any past or future frame (with one minor exception not important for this discussion). Each block of an I frame is encoded independently. Accordingly, when decoding an I frame, no motion processing is necessary. However, for the reasons discussed below, it is necessary to store and access I frames for use in decoding other types of frames.

A P frame, such as P-frame 24, is encoded relative to a past reference frame. A reference frame is a P or I frame. The past reference frame is the closest preceding reference frame. For example, P-frame 24 is shown as referring back to I-frame 20 by reference arrow 29, and thus, I-frame 20 is the past reference frame for P-frame 24. P-frame 28 is shown as referring back to P-frame 24 by reference arrow 30, and thus, P-frame 24 is the past reference frame for P-frame 28. Each macroblock in a P frame can be encoded either as an I macroblock or as a P macroblock. A P macroblock reference frame plus an error term. To specify the location of the P macroblock, a motion vector (i.e., an indication of the relative position of the macroblock in the current frame to the position of the translated area in the past reference frame) is also encoded. When decoding a P macroblock, the 16×16 area from the reference frame is offset according to a motion vector. The decoding function accordingly includes motion compensation, which is performed on a macroblock, in combination with error (IDCT) terms, which are defined on a block by block basis.

A B frame (e.g., B-frames 21, 22, 23, 25, 26, and 27) is encoded relative to the past reference frame and a future reference frame. The future reference frame is the closest proceeding reference frame (whereas the past reference frame is the closest preceding reference frame). Accordingly, the decoding of a B-frame is similar to that of a P frame with the exception that a B frame motion vector may refer to areas in the future reference frame. For example, B-frame 22 is shown as referring back to I-frame 20 by reference arrow 31, and is also shown as referring forward to P-frame 24 by reference arrow 32. For macroblocks that use both past and future reference frames, the two 16×16 areas are averaged and then added to blocks of pixel error terms. The macroblocks from the reference frames are offset according to motion vectors.

Frames are coded using a discrete cosine transform (DCT) coding scheme which transforms pixels (or error terms) into a set of coefficients corresponding to amplitudes of specific cosine basis functions. The discrete cosine transform is applied to image compression to decorrelate picture data prior to quantization. The DCT coefficients are further coded using variable length coding. Variable length coding (VLC) is a statistical coding technique that assigns codewords to values to be encoded. Values having a high frequency of occurrence are assigned short codewords, and those having infrequent occurrence are assigned long codewords. On the average, the more frequent shorter codewords dominate so that the code string is shorter than the original data.

A variety of MPEG frame sequences are possible in addition to that shown (I-B-B-B-P-B-B-B-P-B-B-B-P-B-B-B-I- . . . ) in FIG. 2. Possible alternate sequences include: I-P-P-P-I-P-P-P-I-P-P-P- . . . ; I-B-B-P-B-B-P-B-B-I- . . . ; I-I-I-I-I-I- . . . (known as full motion JPEG); and others. Each choice trades off picture fidelity against compression density against computational complexity.

The above described scheme using I, P, and B frames and motion vectors is often referred to as motion compensation. The pixel error terms are coded via the discrete cosine transform (DCT), quantization, and variable-length coding (VLC). Motion compensation is one of the most computationally intensive operations in many common video decompression methods. When pixels change between video frames, this change is often due to predictable camera or subject motion. Thus, a macroblock of pixels in one frame can be obtained by translating a macroblock of pixels in a previous or subsequent reference frame. The amount of translation is referred to as the motion vector. A motion vector typically uses either full-pixel or half-pixel resolution. When a motion vector has half-pixel resolution, an averaging procedure or method is used at each pixel of the preceding (or proceeding) reference frame to compute the motion-compensated pixels for the current frame which is to be displayed.

Moreover, as mentioned earlier, compression methods such as MPEG employ bi-directional motion compensation (B blocks) wherein a macroblock of pixels in the current frame is computed as the average or interpolation of a macroblock from a past reference frame and a macroblock from a future reference frame. Both averaging and interpolation are computationally intensive operations which require extensive processor resources. Averaging and interpolation severely burden the system processor when implemented in a general purpose processor system since these operations require many additions and divisions for each pixel to be displayed.

Systems unable to keep up with the computational demands of such a decompression burden frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture. Consequently, a significant need exists for reducing the processing requirements associated with decompression methods.

SUMMARY OF THE INVENTION

In a typical video decoder, B frames are decoded by using prediction information from their respective past and future reference frames, as is called for by the specification of the compression method. However, there are usually significant similarities between adjacent B frames "N-1" and "N". Current decoders do not take advantage of these similarities, and thus recompute many pixel values which do not necessarily need to be recomputed.

It has been discovered that using a previous B-frame "N-1" as an additional prediction source for the current B-frame "N" advantageously reduces the computational burden of video decompression. Such decompression may be particularly burdensome when implemented on a general purpose processor system. Pixels for a given macroblock within the current B-frame "N" may reuse pixel values from the previous B-frame "N-1" if they are "similar enough" and thus don't need to be recomputed. The "similarity threshold" may be adaptively adjusted to afford a gradual degradation of picture quality, rather than wholesale skipping of entire frames.

In one method embodiment especially suitable for implementation on a general purpose processor system for decoding compressed video information, a method for determining a plurality of pixel values for a macroblock within a frame "N" of a given type, in a sequence of video frames including a previous frame "N-1" of the given type, includes the steps of: decoding from the compressed video information a descriptor for the macroblock within the frame "N", the descriptor providing information necessary for directing the computation of pixel values for the macroblock within the frame "N"; comparing the descriptor corresponding to the macroblock within the frame "N" to a descriptor corresponding to a respective macroblock within the previous frame "N-1"; and determining a plurality of pixel values corresponding to the macroblock within the frame "N" by reusing a plurality of pixel values corresponding to the respective macroblock within the previous frame "N-1" when the respective descriptors associated with the respective macroblocks within the respective frames "N" and "N-1" differ by less than a predetermined similarity threshold, and otherwise by computation in a manner as directed by the descriptor associated with the macroblock within the frame "N".

In another embodiment for a system for decoding compressed video information, an apparatus for determining a plurality of pixel values for a macroblock within a frame "N" of a given type, in a sequence of video frames including a previous frame "N-1" of the given type, includes: a decoder circuit for decoding from the compressed video information a descriptor corresponding to the macroblock within the frame "N", the descriptor providing information necessary for directing the computation of pixel values for the macroblock within the frame "N"; a descriptor buffer circuit for storing a descriptor corresponding to a respective macroblock within the frame "N-1"; a comparator circuit for comparing the descriptor corresponding to the macroblock within the frame "N" to the descriptor corresponding to the respective macroblock within the previous frame "N-1"; a frame buffer circuit for storing a plurality of pixel values for the respective macroblock within the frame "N-1", for reusing the plurality of pixel values stored therewithin when the respective descriptors associated with the respective macroblocks within the frames "N" and "N-1" differ by less than a predetermined similarity threshold; and a pixel circuit for determining, when the respective groups of motion vectors associated with the respective macroblocks within the frames "N" and "N-1" differ by more than a predetermined similarity threshold, a plurality of pixel values corresponding to the macroblock within the frame "N", by computation in a manner as directed by the descriptor associated therewith, the pixel circuit also for storing the plurality of pixel values into the frame buffer circuit, thereby overwriting the pixel values previously stored therewithin corresponding to the respective macroblock within the B-frame "N-1".

DETAILED DESCRIPTION

The following description is intended to be illustrative of the invention and should not be taken to be limiting.

Figure 1:
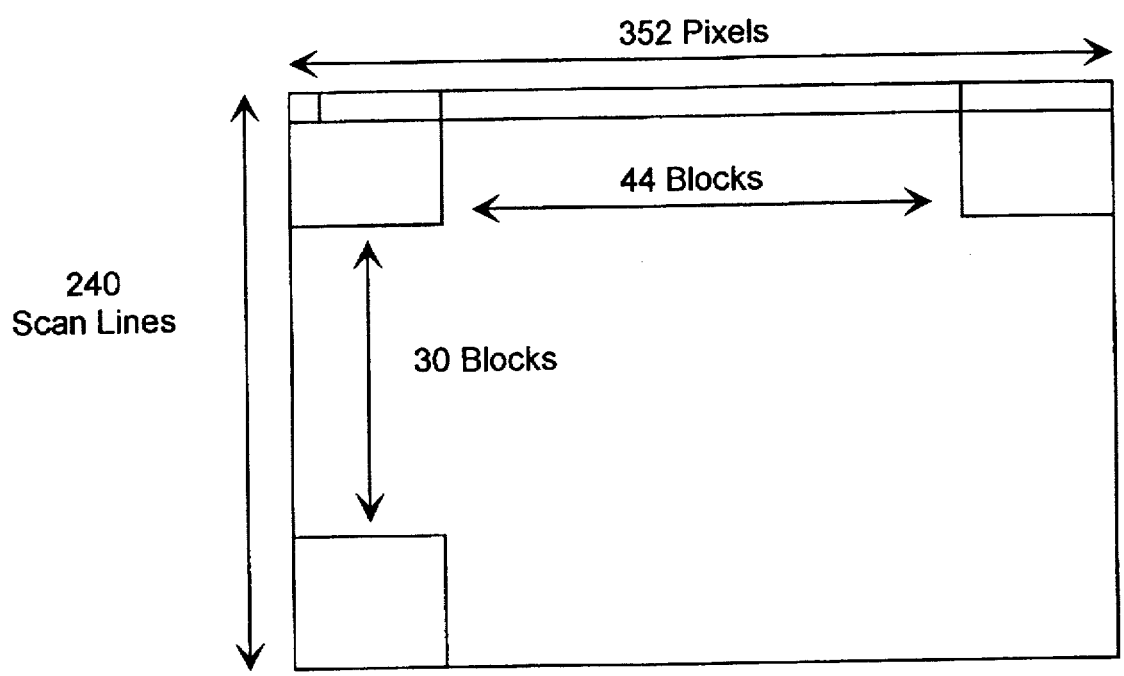
FIG. 1, labeled prior art, shows an arrangement of blocks of pixels on a display screen.
Figure 2:
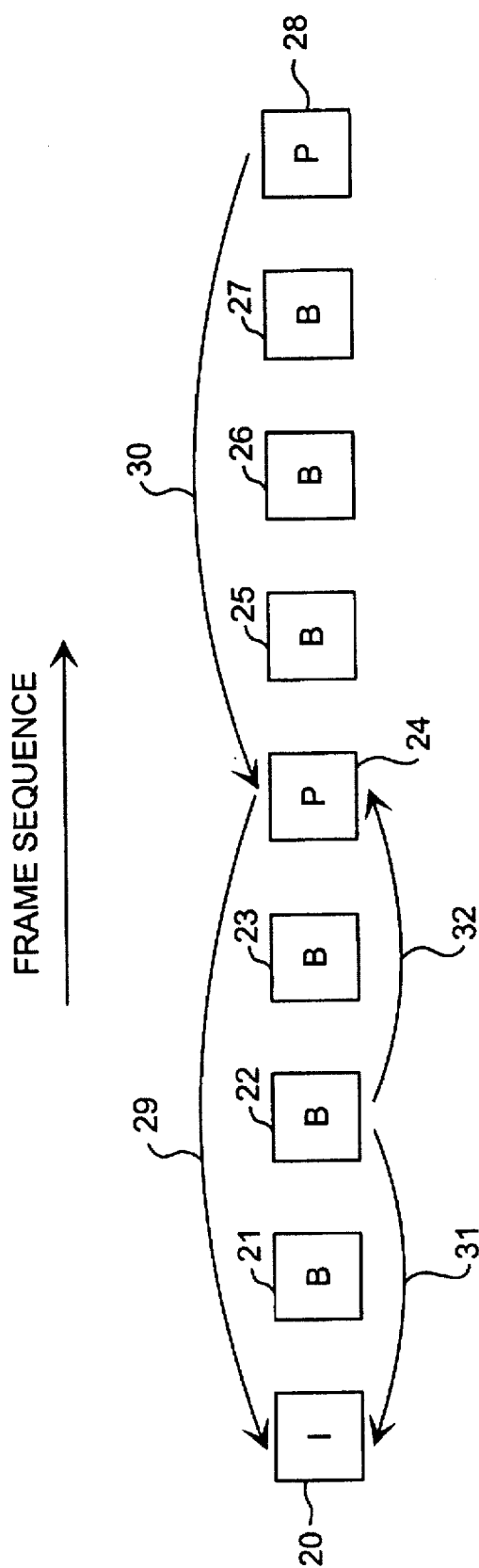
FIG. 2, labeled prior art, shows an example of an MPEG frame sequence.
Figure 3:
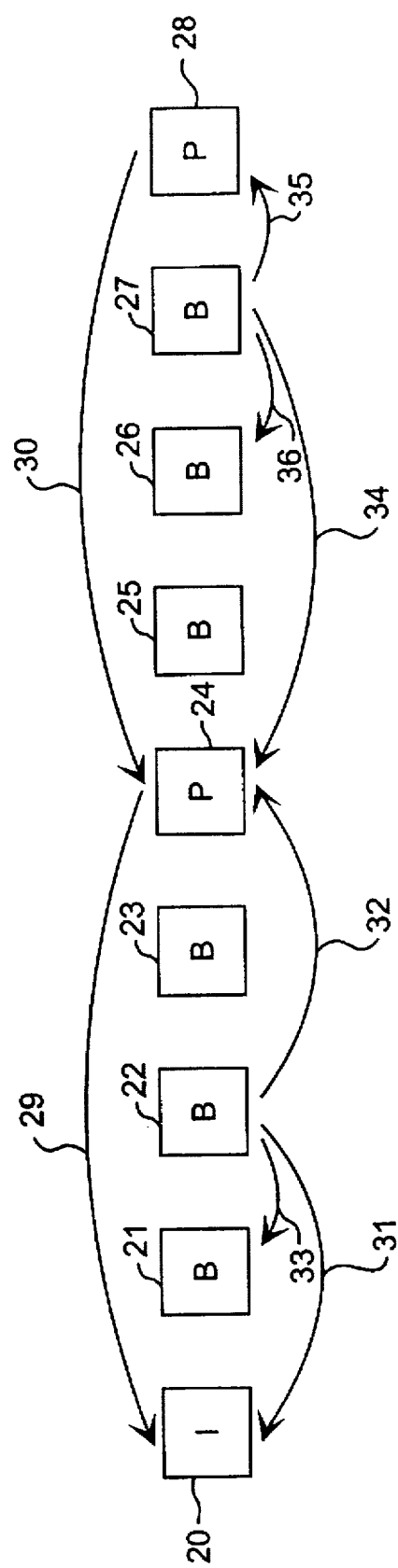
FIG. 3 shows an example of the MPEG frame sequence shown in FIG. 2, with indications of decoding enhancements in accordance with the current invention.

FIG. 3 shows the frame sequence as previously shown in FIG. 2, but with additional prediction sources noted in accordance with the current invention. B-frame 22 is shown as referring back to I-frame 20 by reference arrow 31, and referring forward to P-frame 24 by reference arrow 32, as noted previously. In addition, however, B-frame 22 is shown as "referring back" to previous B-frame 21 by reference arrow 33, indicating the use of B-frame 21 as an additional prediction source for B-frame 22. Likewise, B-frame 27 is shown as referring back to P-frame 24 by reference arrow 34, referring forward to P-frame 28 by reference arrow 35, and now "referring back" to previous B-frame 26 by reference arrow 36. The manner in which a previous B-frame may be used as a prediction source is described below, and which is accomplished while making no change in the MPEG B-frame encoding.

In one embodiment, a frame buffer used to build the current B-frame "N" is initialized with pixel values already determined for the previous B-frame, rather than starting with a new frame buffer or with a frame buffer which has been cleared. Pixels for a given macroblock within the current B frame "N" simply reuse the pixel values from the previous B-frame "N–1" if a descriptor for the macroblock within the current B-frame "N" (e.g., a motion vector) is found to be "similar enough" to a like descriptor for the respective macroblock within the previous B-frame "N–1". If, however, the descriptors are found to be different enough (meaning that the respective pixel values will also be different enough), new computations are executed which determine the pixel values, which are then stored within the frame buffer, thus overwriting the initialized pixel values from the previous B-frame "N–1". A variety of methods may be employed for the similarity test just described using a descriptor decoded for each macroblock. For example, for a given macroblock, a motion vector for both B-frames may be compared: if they differ by less than a similarity threshold value, then the pixel values from the previous B-frame may be used without further computation, for they are already initialized into the current frame buffer. Conversely, if the difference is greater than the similarity threshold, then the system proceeds to perform motion compensation and error term compensation. Such motion compensation and error term compensation, if performed at all, is performed in accordance with the MPEG specification. Such a motion vector comparison may be performed by resolving the total magnitude of the actual vector itself, and comparing to a threshold distance, or alternatively, may computationally be more easily performed by simply comparing each of the ΔX, ΔY terms against a one-dimensional threshold value. Other methods may also be employed to determine a suitable threshold for a "sufficiently small" motion vector difference. Such a similarity threshold may be adaptively adjusted to allow for a decrease in processor requirements while affording a gradual degradation of picture quality, rather than merely skipping entire frames, or may be statically selected based upon a target frame rate anticipated for the system.

Figure 4:
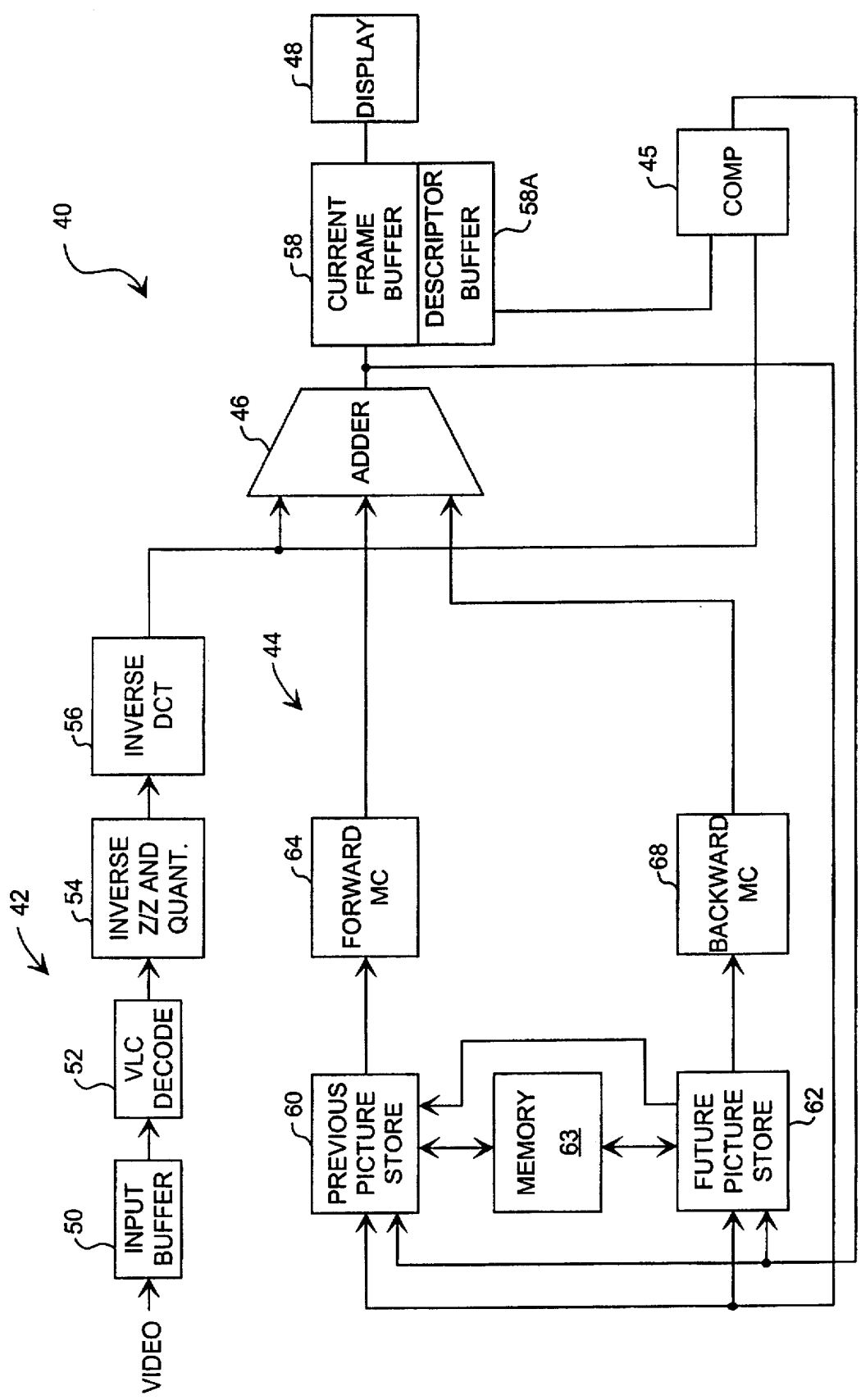
FIG. 4 shows a conceptual block diagram of a video decoder system in accordance with the present invention.

A conceptual system for decompressing video information as described above is shown schematically in FIG. 4. Video system 40 includes input stream decoding portion 42, motion decoding portion 44, adder 46, comparator 45, frame buffer 58, and display device 48. Input stream decoding portion 42 receives a stream of compressed video information and provides blocks of staticly decompressed video information to adder 46. Motion decoding portion 44 receives motion information and provides motion-compensated pixels to adder 46. Adder 46 receives the staticly decompressed video information and the motion-compensated pixels and provides decompressed pixels to frame buffer 58, which then provides the information to display 48.

Input stream decoding portion 42 includes input buffer 50, variable length coding (VLC) decoder 52, inverse zig-zag and quantizer circuit 54 and inverse discrete cosine transform (IDCT) circuit 56. Motion decoding portion 44 includes previous picture store circuit 60, future picture store circuit 62, memory 63, forward motion compensation circuit 64 and backward motion compensation circuit 68. Frame buffer 58 captures a display frame as it is decoded and assembled macroblock by macroblock, and allows information provided by adder 46 to be rasterized prior to display by display device 48.

Input stream decoding portion 42 provides staticly decompressed pixels (such as pixel error terms) to adder 46 on a block by block basis. Additionally, forward motion compensation circuit 64 and backward motion compensation circuit 68 of motion decoding portion 44 provide motion-compensated pixel values to adder 46 on a macroblock by macroblock basis. Adder 46 provides display pixel values to frame buffer 58 on a macroblock by macroblock basis until a frame is completed, which is then provided to previous picture store circuit 60 (in the case of an I or P past reference frame) and to future picture store circuit 62 (in the case of an I or P future reference frame).

In operation, input buffer 50 receives a compressed video signal from a video signal source such as a CD ROM (not shown); the compressed video signal is provided as a stream of compressed video information. Input buffer 50 buffers this compressed video signal to compensate for the speed which the signal is provided by the video source. This buffered compressed video signal is provided to VLC decoder 52 which decodes the variable length coded portion of the compressed signal to provide a variable length decoded signal to inverse zig-zag and quantizer circuit 54 which decodes the variable length decoded signal to provide a zig-zag decoded and dequantized signal. The inverse zig-zag and quantization compensates for the fact that while a compressed video signal is compressed in a zig-zag fashion, the zig-zag decoded and dequantized signal is provided to inverse DCT circuit 56 as sequential blocks of information. Accordingly, this zig-zag decoded and dequantized signal provides blocks to macroblocks which are in the order required for raster scanning across display 58.

This zig-zag decoded and dequantized signal is then provided to inverse DCT circuit 56 which performs an inverse discrete cosine transform on the zig-zag decoded and dequantized video signal on a block by block basis to provide a staticly decompressed pixel values. Such pixel values may be used to present a static image on display 58 or may be used as a frame within a sequence of frames for presentation of a motion image on display 58.

The staticly decompressed pixel values are provided to adder 46 which, if the block does not include any motion information (e.g., I frames) are then provided unchanged to frame buffer 58. However, for video signals which include motion information (e.g., certain B frames and P frames), adder 46 adds the decompressed pixel error terms to the forward motion compensation and backward motion compensation outputs from motion decode portion 44 to generate the display pixel values which are provided to frame buffer 58 and then to display 48. More specifically, forward motion vectors are used to translate pixels in previous picture store circuit 60 and backward motion vectors are used to translate pixels in future picture store circuit 62 and this information is added to the output provided by inverse DCT circuit 56.

For an I frame, on which no motion compensation is performed, the inverse DCT output provides the display pixel values directly for each block, which are transmitted through adder 46 to frame buffer 58 (for display), and which are also provided to previous picture store circuit 60. Previous picture store circuit 60 stores the blocks of video information in memory 63 for access in performing motion compensation on future frames of video information.

If the frame is a P frame, motion compensation may be performed by motion compensation portion 44. More specifically, previous frame information is accessed from memory 63 via previous picture store circuit 60. The previous picture information is then forward motion compensated by forward motion compensation circuit 64 to provide a forward motion-compensated macroblock of pixel values. Then the pixel error terms provided by inverse DCT circuit 56 are added with the forward motion-compensated pixel values to provide a macroblock of the P frame. After all macroblocks are similarly computed, the P frame is both transferred to display 48 and to memory 63 via future picture store circuit 62 for future use.

If the frame is a B frame, then motion compensation is performed and motion compensation portion 44 is used. More specifically, previous picture information and future picture information is accessed from memory 63 via previous picture store circuit 60 and future picture store circuit 62. The previous picture information is then forward motion compensated by forward motion compensation circuit 64 to provide a forward motion-compensated pixel macroblock. Additionally, the future picture information is backward motion compensated by backward motion compensation circuit 68 to provide a backward motion-compensated pixel macroblock. The averaging of these two macroblocks yields a bidirectional motion-compensated macroblock. Next, pixel error terms which are provided by inverse DCT circuit 56 are added to the bidirectional motion-compensated macroblock to provide a macroblock of pixel values for the B frame, which is then stored within frame buffer 58. After all macroblocks are similarly computed, the completed B-frame of display pixel values is transferred to display 48.

If the next frame received is also a B-frame, the contents of frame buffer 58 corresponding to the previous B-frame are maintained, rather than the frame buffer 58 cleared. Then, as each macroblock is encountered and processing begun, a determination by comparator 45 is made as to whether the pixel values destined to be calculated for the current B-frame will be similar or identical to the pixel values for the respective macroblock within the previous B-frame (whose descriptor is stored within descriptor buffer 58A), and which pixel values are already loaded into the macroblock's position within the frame buffer 58 (which, of course, is the buffer in which the current B-frame display pixel values will be assembled for display). As mentioned previously, a variety of methods may be employed for testing the similarity of the two respective macroblocks' pixel values. For example, for a given macroblock, motion vectors for both B-frames may be compared: if they differ by less than a similarity threshold value, then the pixel values (in this case, display pixel values) already initialized from the previous B-frame may be used without further computation. Such a motion vector comparison may be performed by resolving the total magnitude of the actual vector itself, and comparing to a threshold distance, or alternatively, may computationally be more easily performed by simply comparing each of the ΔX, ΔY terms against a one-dimensional threshold value. Other methods may also be employed to determine a suitable threshold for a "sufficiently small" motion vector difference (or other descriptor difference).

The system just described is also advantageous when skipped macroblocks are encountered in a B-frame. Each macroblock descriptor in a B-frame is compared against the respective macroblock descriptor within the previous B-frame: If both indicate skipped macroblocks, then the display pixel values may be reused, and new pixel computation avoided.

Figure 5:
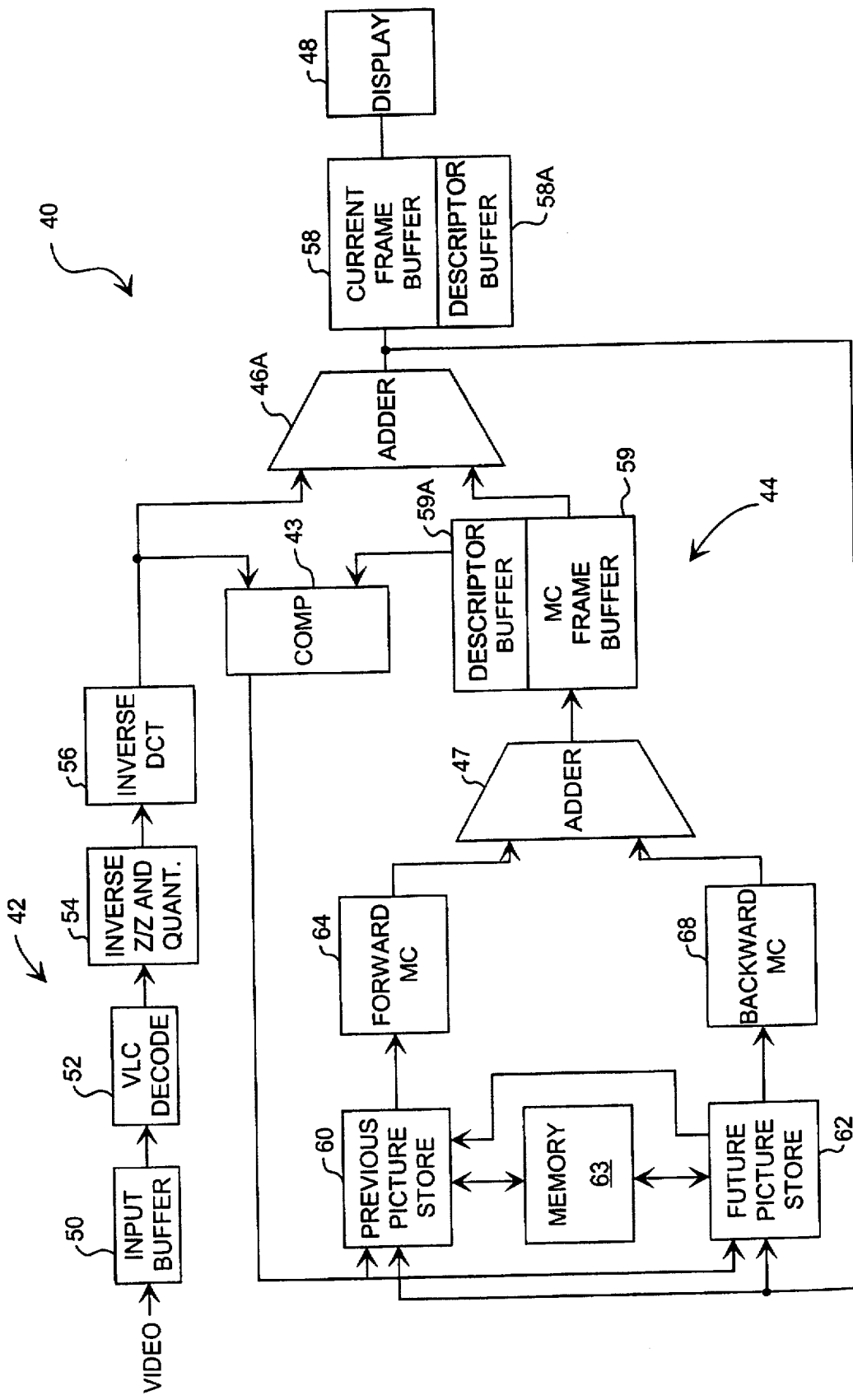
FIG. 5 shows a conceptual block diagram of a second embodiment of a video decoder system in accordance with the present invention.

Another embodiment of the current invention which advantageously utilizes pixel values from a previous B-frame is shown in FIG. 5. In this example, the motion-compensated pixel values from both forward and backward motion compensation are first averaged together in adder 47 and stored within a frame buffer 59, which output is then added by adder 46A to the pixel error terms provided by Inverse DCT circuit 56, as before. Alternate descriptor buffer 59A and alternate comparator 43 may be employed to compare the respective descriptors in lieu of or in addition to descriptor buffer 58A and comparator 45. Frame buffer 58 may optionally be included or not included. By saving the motion-compensated pixel values for each macroblock within a frame before addition of the respective pixel error terms for each block, the motion-compensated pixel values may be reused and added with the pixel error terms for the respective block in a subsequent frame. In other words, if the two macroblocks have the same or similar descriptors (e.g., motion vectors) as discussed above, the pixels obtained from motion compensation in B-frame "N–1" are reused, but the pixel error terms for the macroblock in B-frame "N" are recomputed and added to the macroblock obtained from B-frame "N–1". Nonetheless, a large amount of computational burden has been avoided by reuse of the motion-compensated pixel values as, in the worst case, each pixel value in B-frame "N" is determined by a mathematical operation which effectively averages up to 16×16 different pixel values within the respective previous and future reference frames.

To be able to compare a motion vector for each macroblock with a motion vector for the incoming macroblock decoded from the video stream, for example, requires a small amount of additional storage, provided by descriptor buffer 58A and/or 59A associated with the frame buffer 58 and/or frame buffer 59. Likewise, such additional storage is also required to note each skipped macroblock in the B-frame "N–1", and if so, the pixel values in the frame buffer 58 may be reused for such skipped macroblock. Such additional storage requirements are modest in comparison to the computational savings achieved by using these techniques and systems. For example, the additional memory required for storing motion compensation vectors is typically a 396×4 byte array, given that 396 macroblocks comprise a typical MPEG frame, and that the maximum displacement of each coordinate in a motion vector is ±21 pixels for each of X and Y.

One especially significant advantage of this invention is a reduction in required computational power, combined with a gradual degradation of picture quality. Systems unable to keep up with the computational demands of such a decompression burden frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture. By monitoring the achieved frame rate versus the desired frame rate, the similarity threshold may be adaptively adjusted to achieve sufficient reduction in computational burden to allow the system to reach the desired frame rate. If the desired frame rate is not being achieved, the threshold for similarity may be raised so that more pixel values are reused and the computational requirements are reduced. Conversely, the similarity threshold may be staticly selected based upon a target frame rate expected to be achieved by the system.

OTHER EMBODIMENTS

Other embodiments are within the following claims. For example, the various modules or portions of video system 40 may be provided in either hardware or software or a combination thereof. For example, video system 40 may be provided by software that is designed to be executed on a general purpose processor system. For example, inverse DCT circuit 26 may be configured as a microprocessor which is adapted to execute an inverse DCT algorithm. Conversely, video system 40 may be implemented in a more traditional special purpose hardware system, optimized to perform the described functions typically using dedicated hardware units.

Also, for example, while the present invention is set forth with reference to MPEG video compression, other similar compression schemes are equally contemplated and are intended to fall within the scope of the following claims.

What is claimed is:

1. In a system for decoding compressed video information, a method for determining a plurality of pixel values for a macroblock within a frame "N" of a given type, in a sequence of video frames including a previous frame "N–1" of the given type, comprising the steps of:

decoding from the compressed video information a descriptor for the macroblock within the frame "N", said descriptor providing information necessary for directing the computation of pixel values for the macroblock within the frame "N";

comparing the descriptor corresponding to the macroblock within the frame "N" to a descriptor corresponding to a respective macroblock within the previous frame "N–1"; and determining a plurality of pixel values corresponding to the macroblock within the frame "N" by reusing a plurality of pixel values corresponding to the respective macroblock within the previous frame "N–1" when the respective descriptors associated with the respective macroblocks within the respective frames "N" and "N–1" differ by less than a predetermined similarity threshold, and otherwise by computation in a manner as directed by the descriptor associated with the macroblock within the frame "N".

2. A method as in claim 1 wherein the descriptor comprises an indication that a respective macroblock corresponding thereto is a skipped macroblock.

3. A method as in claim 1 wherein the descriptor comprises a motion vector for a respective macroblock corresponding thereto, said motion vector relative to a frame of a type different than the given type.

4. A method as in claim 1 wherein a plurality of pixel values comprises a plurality of display pixel values.

5. A method as in claim 1 wherein a plurality of pixel values comprises a plurality of motion-compensated pixel values.

6. A method as in claim 1 wherein the predetermined similarity threshold is adaptively adjusted based upon an achieved frame rate relative to a desired frame rate of the system.

7. A method as in claim 1 wherein the predetermined similarity threshold is staticly selected based upon a target frame rate.

8. A method as in claim 1 wherein the compressed video information comprises MPEG compressed video information.

9. A method as in claim 8 wherein a frame of the given type comprises a B-frame.

10. A method as in claim 1 wherein the system comprises a general purpose processor system.

11. A method as in claim 1 wherein the system comprises a special purpose hardware system.

12. In a system for decoding compressed video information, an apparatus for determining a plurality of pixel values for a macroblock within a frame "N" of a given type, in a sequence of video frames including a previous frame "N–1" of the given type, comprising:

a decoder circuit for decoding from the compressed video information a descriptor corresponding to the macroblock within the frame "N", said descriptor providing information necessary for directing the computation of pixel values for the macroblock within the frame "N";

a descriptor buffer circuit for storing a descriptor corresponding to a respective macroblock within the frame "N–1";

a comparator circuit for comparing the descriptor corresponding to the macroblock within the frame "N" to the descriptor corresponding to the respective macroblock within the previous frame "N–1";

a frame buffer circuit for storing a plurality of pixel values for the respective macroblock within the frame "N–1", for reusing said plurality of pixel values stored therewithin when the respective descriptors associated with the respective macroblocks within the frames "N" and "N–1" differ by less than a predetermined similarity threshold; and a pixel circuit for determining, when the respective descriptors associated with the respective macroblocks within the frames "N" and "N–1" differ by more than a predetermined similarity threshold, a plurality of pixel values corresponding to the macroblock within the frame "N", by computation in a manner as directed by the descriptor associated therewith, and said pixel circuit for storing said plurality of pixel values into the frame buffer circuit, thereby overwriting the plurality of pixel values corresponding to the respective macroblock within the B-frame "N–1" and previously stored therewithin.

13. An apparatus as in claim 12 wherein the pixel circuit comprises a motion compensation circuit for generating a plurality of motion-compensated pixel values.

14. An apparatus as in claim 13 wherein the plurality of pixel values corresponding to a macroblock comprises a plurality of display pixel values, and wherein the pixel circuit further comprises an adder circuit for adding a plurality of pixel error terms to the plurality of motion compensated pixel values.

15. An apparatus as in claim 13 wherein the plurality of pixel values corresponding to a macroblock comprises a plurality of motion-compensated pixel values, and wherein the pixel circuit further comprises an adder circuit for adding a plurality of pixel error terms to the plurality of motion-compensated pixel values.

16. In a system for decoding MPEG compressed video information, a method for determining a plurality of display pixel values for a macroblock within a B-frame "N", in a sequence of video frames including a previous B-frame "N−1", comprising the steps of:

initializing the plurality of display pixel values for the macroblock within the B-frame "N" with a previously determined plurality of display pixel values corresponding to the respective macroblock within the B-frame "N−1";

decoding from the compressed video information a descriptor for the macroblock within the B-frame "N", said descriptor providing information necessary for directing the computation of display pixel values for the macroblock within the B-frame "N";

comparing the descriptor corresponding to the macroblock within the B-frame "N" to a descriptor corresponding to a respective macroblock within the previous B-frame "N−1";

calculating the plurality of display pixel values for the macroblock within the B-frame "N" if the respective descriptors associated with the respective macroblocks within the B-frame "N" and the B-frame "N−1" differ by more than a predetermined similarity threshold, by computation in a manner as directed by the descriptor associated with the macroblock within the B-frame "N", thereby over-writing the previously initialized plurality of display pixel values from the previous B-frame "N−1"; and reusing the initialized plurality of display pixel values for the macroblock within the B-frame "N" if the respective descriptors associated with the respective macroblocks within the B-frame "N" and the B-frame "N−1" differ by less than the predetermined similarity threshold.

17. A method as in claim 16 wherein the descriptor comprises an indication that a respective macroblock corresponding thereto is a skipped macroblock.

18. A method as in claim 16 wherein the descriptor comprises a motion vector for a respective macroblock corresponding thereto, said motion vector relative to a reference frame.

19. A method as in claim 16 wherein the descriptor comprises a forward motion vector and a backward motion vector for a respective macroblock corresponding thereto, said forward motion vector relative to a past reference frame, and said backward motion vector relative to a future reference frame.

20. A method as in claim 16 wherein the predetermined similarity threshold is adaptively adjusted based upon an achieved frame rate relative to a desired frame rate of the system.

21. A method as in claim 16 wherein the predetermined similarity threshold is staticly selected based upon a target frame rate.

22. A method as in claim 16 wherein the initializing step comprises reusing a frame buffer containing the previously determined plurality of display pixels corresponding to the respective macroblock within the B-frame "N−1" and already stored therewithin.

23. In a system for decoding MPEG compressed video information, a method for calculating display pixel values for a macroblock within a B-frame "N", in a sequence of video frames including a previous B-frame "N−1", comprising the steps of:

decoding from the compressed video information a motion vector and a plurality of pixel error terms for the macroblock within the B-frame "N";

comparing the motion vector corresponding to the macroblock within the B-frame "N" to a motion vector corresponding to a respective macroblock within the previous B-frame "N−1";

determining a plurality of motion-compensated pixel values corresponding to the macroblock within the B-frame "N" by reusing a plurality of motion-compensated pixel values corresponding to the respective macroblock within the previous B-frame "N−1" when the respective motion vectors associated with the respective macroblocks within the B-frames "N" and "N−1" differ by less than a predetermined similarity threshold, and otherwise by computation in a manner as directed by the motion vector associated with the macroblock within the B-frame "N"; and adding the decoded plurality of pixel error terms to the plurality of motion-compensated pixel values corresponding thereto to complete the plurality of display pixel values for the macroblock within the B-frame "N".

24. A method as in claim 23 wherein the predetermined similarity threshold is adaptively adjusted based upon an achieved frame rate relative to a desired frame rate of the system.

25. A method as in claim 23 wherein the predetermined similarity threshold is staticly selected based upon a target frame rate.

26. In a system for decoding MPEG compressed video information, an apparatus for determining a plurality of display pixel values for a macroblock within a B-frame "N", in a sequence of video frames including a previous B-frame "N−1", comprising:

a decoder circuit for decoding from the compressed video information a motion vector and a plurality of pixel error terms corresponding to the macroblock within the B-frame "N";

a motion vector buffer circuit for storing a motion vector corresponding to a respective macroblock within the B-frame "N−1";

a comparator circuit for comparing the motion vector corresponding to the macroblock within the B-frame "N" to the motion vector corresponding to the respective macroblock within the previous B-frame "N−1";

a frame buffer circuit for storing a plurality of motion-compensated pixel values for the respective macroblock within the B-frame "N−1", for reusing said plurality of motion-compensated pixel values stored therewithin when the respective motion vectors associated with the respective macroblocks within the B-frames "N" and "N−1" differ by less than a predetermined similarity threshold;

motion compensation circuit for determining, when the respective groups of motion vectors associated with the respective macroblocks within the B-frames "N" and "N−1" differ by more than the predetermined similarity threshold, a plurality of motion-compensated pixel values corresponding to the macroblock within the B-frame "N", by computation in the manner as directed by the motion vector associated therewith, and for storing said plurality of motion-compensated pixel values into the frame buffer circuit, thereby overwriting the plurality of motion-compensated pixel values previously stored therewithin corresponding to the respective macroblock within the B-frame "N−1"; and an adder circuit for adding the plurality of motion-compensated pixel values corresponding to the macroblock within the B-frame "N" to the decoded plurality of error terms corresponding thereto, thereby producing the plurality of display pixel values for the macroblock within the B-frame "N".

27. An apparatus as in claim 26 wherein a motion vector corresponding to a macroblock within a B-frame comprises a forward motion vector relative to a past reference frame.

28. An apparatus as in claim 26 wherein a motion vector corresponding to a macroblock within a B-frame comprises a backward motion vector relative to a future reference frame.

29. An apparatus as in claim 26 wherein a motion vector corresponding to a macroblock within a B-frame comprises both a forward motion vector relative to a past reference frame and a backward motion vector relative to a future reference frame.

30. An apparatus as in claim 26 wherein the apparatus is implemented within a general purpose processor system.

31. An apparatus as in claim 26 wherein the apparatus is implemented within a special purpose hardware system.

32. In a system for decoding MPEG compressed video information, an apparatus for determining a plurality of display pixel values for a macroblock within a B-frame "N", in a sequence of video frames including a previous B-frame "N−1", comprising:

a decoder circuit for decoding from the compressed video information a motion vector and a plurality of pixel error terms corresponding to the macroblock within the B-frame "N";

a motion vector buffer circuit for storing a motion vector corresponding to a respective macroblock within the B-frame "N−1";

a comparator circuit for comparing the motion vector corresponding to the macroblock within the B-frame "N" to the motion vector corresponding to the respective macroblock within the previous B-frame "N−1";

a frame buffer circuit for storing a plurality of display pixel values for the respective macroblock within the B-frame "N−1", for reusing said plurality of display pixel values stored therewithin, when the respective motion vectors associated with the respective macroblocks within the B-frames "N" and "N−1" differ by less than a predetermined similarity threshold;

a motion compensation circuit for determining, when the respective motion vectors associated with the respective macroblocks within the B-frames "N" and "N−1" differ by more than the predetermined similarity threshold, a plurality of motion-compensated pixel values corresponding to the macroblock within the B-frame "N", by computation in a manner as directed by the motion vector associated therewith; and an adder circuit for adding the plurality of motion-compensated pixel values corresponding to the macroblock within the B-frame "N" to the decoded plurality of error terms corresponding thereto, thereby producing the plurality of display pixel values for the macroblock within the B-frame "N", and for storing said plurality of display pixel values into the frame buffer circuit, thereby overwriting the plurality of display pixel values corresponding to the respective macroblock within the B-frame "N−1" and previously stored therewithin.

33. An apparatus as in claim 32 wherein a motion vector corresponding to a macroblock within a B-frame comprises a forward motion vector relative to a past reference frame.

34. An apparatus as in claim 32 wherein a motion vector corresponding to a macroblock within a B-frame comprises a backward motion vector relative to a future reference frame.

35. An apparatus as in claim 32 wherein a motion vector corresponding to a macroblock within a B-frame comprises both a forward motion vector relative to a past reference frame and a backward motion vector relative to a future reference frame.

36. An apparatus as in claim 32 wherein the apparatus is implemented within a general purpose processor system.

37. An apparatus as in claim 32 wherein the apparatus is implemented within a special purpose hardware system.

38. An apparatus as in claim 36 wherein the motion compensation circuit includes:

a forward motion compensation circuit for generating a plurality of forward-predicted motion-compensated pixel values;

a backward motion compensation circuit for generating a plurality of backward-predicted motion-compensated pixel values; and an adder for generating a plurality of bi-predicted motion-compensated pixel values.

* * * * *